(12) United States Patent
Fonder

(10) Patent No.: US 12,543,747 B1
(45) Date of Patent: Feb. 10, 2026

(54) BAKING DEVICE

(71) Applicant: Tyson Fonder, Minneapolis, MN (US)

(72) Inventor: Tyson Fonder, Minneapolis, MN (US)

( * ) Notice: Subject to any disclaimer, the term of this patent is extended or adjusted under 35 U.S.C. 154(b) by 862 days.

(21) Appl. No.: 17/721,674

(22) Filed: Apr. 15, 2022

Related U.S. Application Data

(60) Provisional application No. 63/175,267, filed on Apr. 15, 2021.

(51) Int. Cl.
*A21B 3/13* (2006.01)
(52) U.S. Cl.
CPC .............. *A21B 3/138* (2013.01); *A21B 3/131* (2013.01); *A21B 3/135* (2013.01)
(58) Field of Classification Search
CPC .......... A21B 3/135; A21B 3/131; A21B 3/138
USPC ......... 99/372, 383, 348, 352, 426, 427, 428, 99/439, 448; 426/107, 113, 234, 243
See application file for complete search history.

(56) References Cited

U.S. PATENT DOCUMENTS

2005/0011261 A1* 1/2005 Lyon ....................... G01F 19/00
73/427
2005/0211101 A1* 9/2005 Finnie, II ............... A21B 3/138
99/279

* cited by examiner

*Primary Examiner* — Phuong T Nguyen
(74) *Attorney, Agent, or Firm* — Johnson and Phung; Thomas N. Phung

(57) ABSTRACT

A cupcake-pan accessory that includes a reusable liner for receiving and holding food items during baking with the reusable liner including a flexible sidewall having a cupcake pan individual cup engaging exterior surface, an interior surface, a top edge and a bottom edge, a base connected to the flexible sidewall proximal the bottom edge of the flexible sidewall, and at least two baking food item measurement indictors molded to the sidewall and visible around the interior surface of the flexible sidewall with the measurement indictors each representing a specific volume or weight of food items supported by the liner to facilitate precise measurement of baking food items.

18 Claims, 2 Drawing Sheets

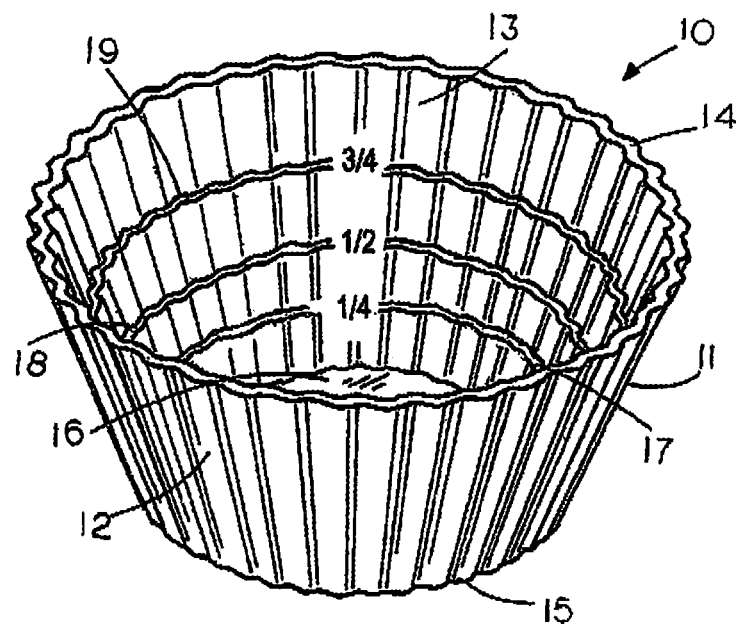
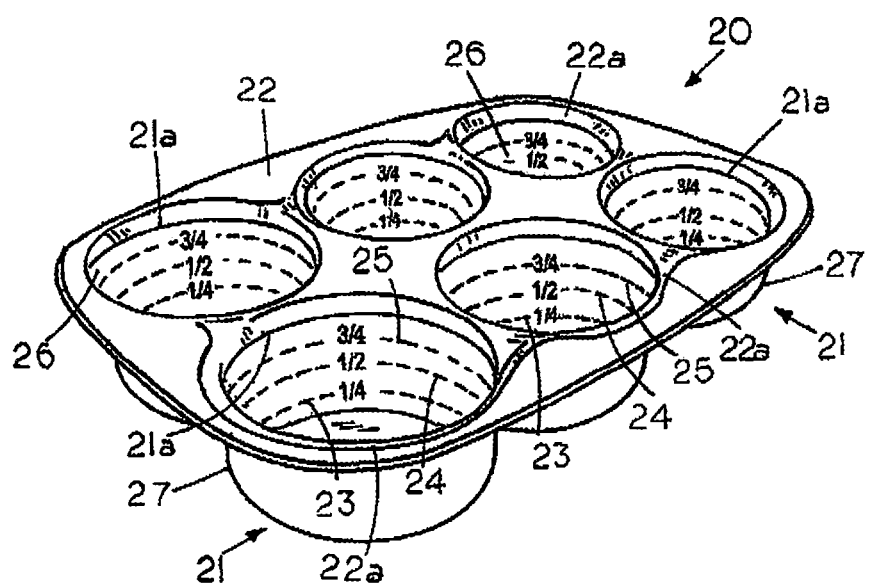

BAKING DEVICE

FIELD OF THE INVENTION

This invention relates generally to baking and, more specifically to a baking device that includes specific measurement indicators located within the interior surface of the device to facilitate precise measurement of food items.

CROSS REFERENCE TO RELATED APPLICATIONS

This application claims priority to currently pending U.S. Provisional Application Ser. No. 63/175,267; filed on Apr. 15, 2021; titled IMPROVEMENT ON BAKING DEVICE.

STATEMENT REGARDING FEDERALLY SPONSORED RESEARCH OR DEVELOPMENT

None

REFERENCE TO A MICROFICHE APPENDIX

None

BACKGROUND OF THE INVENTION

Traditional baking cups and cupcake and muffin pans work for their intended purpose. However, the aforementioned baking equipment do not provide a useful indicator of the precise amount of food items that is to be baked therein, which is problematic for those who may be using the aforementioned baking equipment to prepare food for their specific diet such as those who may be on a specific calorie, carbohydrate or protein count. As a result, a preparer must estimate the amount of food items that is filled within the baking equipment, which may lead to a miscount of the preparer's food consumption for their specific diets.

The present invention solves the above problem by providing for a baking device that includes specific measurement indictors located within the interior surface of the device to facilitate precise measurement of food items.

SUMMARY OF THE INVENTION

Briefly, the present invention comprises a cupcake-pan accessory that includes at least one reusable silicone-based liner for receiving and holding food items during baking. The reusable silicone-based liner includes a flexible sidewall having a cupcake pan individual cup engaging exterior surface, an interior surface, a top edge and a bottom edge and a base connected to the flexible sidewall proximal the bottom edge of the flexible sidewall.

The reusable silicone-based liner also includes at least two baking food item measurement indictors molded to the sidewall and visible around the interior surface of the flexible sidewall with the measurement indictors each representing a specific volume or weight of food items supported by the liner to facilitate precise measurement of baking food items.

The measurement indictors each extends at least 1.0 millimeters inward from the interior surface of the liner or alternatively at least 1.0 millimeters outward from the exterior surface of the liner to provide for corresponding measurement indicators on an exterior surface of a baked food item supported by the liner.

An optional feature of the liner is that the sidewall of the liner is more flexible than the base to facilitate removal of a baked food item supported by the liner.

BRIEF DESCRIPTION OF THE DRAWINGS

FIG. 1 is a perspective view showing an embodiment of cupcake-pan accessory of the present invention;

FIG. 2 is a perspective view showing an alternative embodiment of a cupcake-pan accessory having six reusable silicone-based liners;

DESCRIPTION OF THE PREFERRED EMBODIMENT

Figure 3:
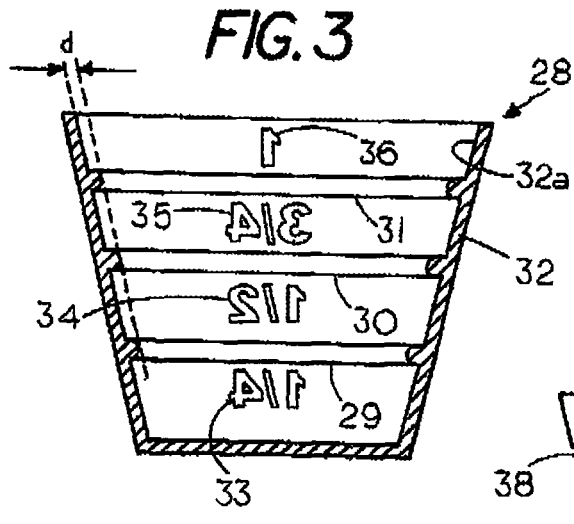
FIG. 3 is a cross-sectional view showing an alternative embodiment of a reusable silicone-based liner.

The general purpose of the present invention, which will be described subsequently in greater detail, is to provide a baking device such as a baking cup, baking liner, or a cupcake or muffin baking pan that includes specific measurement indictors located within the interior surface of the device to facilitate precise measurement of food items.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring to the drawings, FIG. 1 is a perspective view showing an embodiment of cupcake-pan accessory of the present invention comprising a reusable liner 10 for receiving and holding food items during baking with the term "food items" referring to the any type of edible items that may be supported by the liner for baking purposes and may include but is not limited to various types of batter, grains, meats, vegetable, fruits, or their various combinations.

The reusable liner 10 may be formed from any type of flexible baking oven safe flexible material, such as for example silicone, and includes a flexible sidewall 11 having a cupcake pan individual cup engaging exterior surface 12, an interior surface 13, a top edge 14 and a bottom edge 15 and a base 16 connected to the flexible sidewall 11 proximal the bottom edge 15 of the flexible sidewall 11. The base 16 may comprise various shapes and sizes with the shape of based 16 including but not limited to circular-shaped, square-shaped, diamond-shaped, or triangular shaped.

Although the flexible sidewall 11 of reusable liner 10 is shown pleated or corrugated to facilitate removal of a baked food item supported by the liner 10 after the baked food item has been baked and to facilitate removal of the liner 10 from the individual cups of the cupcake or muffin pan, due to the flexible feature of the flexible sidewall 11, the flexible sidewall 11 may alternatively be smooth yet still facilitate removal of the baked food item supported by the liner 10 through the inverting or outward bending of the flexible sidewall 11 proximal the top edge 14 region.

Another feature of the present invention is that the sidewall 11 of the liner 10 may be more flexible than the base 16 of the liner 10 to provide liner 10 with increased structural support while also maintaining the feature of the flexible sidewall 11 facilitating removal of the baked food item supported by the liner 10 through the inverting or outward bending of the flexible sidewall 11 proximal the top edge 14 region.

Another feature of the present invention is that the reusable liner 10 also includes at least two baking food item measurement indictors 17, 18, 19 molded to the sidewall 11 and visible around the interior surface 13 of the flexible sidewall 11 with the measurement indictors 17, 18, 19 each representing a specific volume or weight of food items supported by the liner 10 to facilitate precise measurement of baking food items.

The measurement indictors 17, 18, 19 may be embossed or debossed to the interior surface 13 of the reusable liner 10. The measurement indictors may also be in the form of a different coloration marking, various indentations, protrusions, or the like to provide the user with a clear visual indicator of the location of the measurement indictors. For example, in the embodiment of FIG. 1 measurement indictors 17, 18, 19 of the reusable liner 10 are integrally formed during a molding process of the reusable liner 10.

In the embodiment shown in FIG. 1, the reusable liner 10 is shown having three measurement indictors 17, 18, 19 each representing a quarter cup of food item increments. More specifically, from base 16 measurement indictor 17 represents ¼ cup of food items, measurement indictor 18 represents ½ cup of food items, and measurement indictor 19 represents ¾ cup of food items. Alternative embodiments may include a reusable liner having smaller measurement indictors ranges or increments such as but not limited to ⅛ of a cup or lower. In addition, alternative embodiments of the present invention may include measurement indictors comprising certain amounts of liters or milliliters, conversions to ounces and conversion to grams and kilograms to enable the user to know the precise amount of food item that is being filled into the device.

Although FIG. 1 shows the cupcake-pan accessory as comprising the reusable liner 10, the cupcake-pan accessory may alternatively comprise either a one-time use baking liner for supporting baking food items therein within a baking cup or a cupcake or muffin baking pan or a reusable silicone-based stand-alone baking cup that does require the use of the baking cup or baking pan.

FIG. 2 is a perspective view showing an alternative embodiment of a cupcake-pan accessory 20 of the present invention comprising six reusable silicone-based liners 21 each having similar components to the reusable liner 10 of FIG. 1. However, unlike the reusable liner 10, each of the reusable silicone-based liners 21 includes a top edge 21a connected to a baking liner support frame 22 and more specifically, to a corresponding orifice 22a of baking liner support frame 22.

Each of the reusable silicone-based liners 21 function to support baking food items therein either within a corresponding cup of a cupcake or muffin baking pan or in a stand-alone condition during the baking process. A feature of the baking liner support frame 22 is that baking liner support frame 22 also functions facilitate removal of the reusable silicone-based liners 21 from the cups of the cupcake or muffin pan that the reusable silicone-based liners 21 are supported in during the baking process.

Similar to the baking cup of FIG. 1, each of the reusable silicone-based liners 21 of FIG. 2 includes baking food item measurement indictors 23, 24, 25 visible around an interior surface 26 of a flexible sidewall 27 of each of the reusable silicone-based liners 21 with the measurement indictors 23, 24, 25 each representing a specific volume or weight of food items supported by the liner 21 to facilitate precise measurement of baking food items.

Figure 3A:
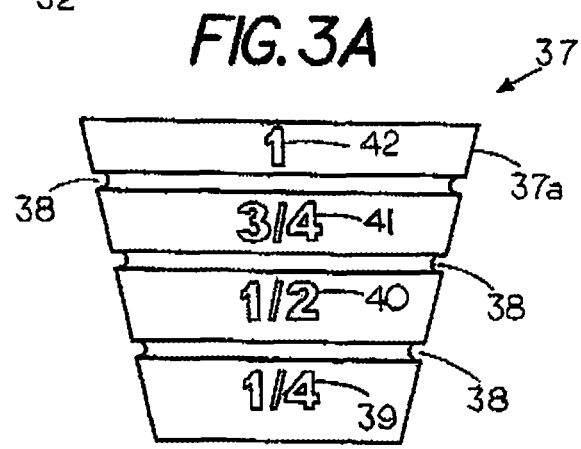
FIG. 3A is a side view showing a baked food item created by the silicone-based liner of FIG. 3.

Referring to FIGS. 3 and 3A, FIG. 3 is a cross-sectional view showing an alternative embodiment of a cupcake-pan accessory of the present invention comprising a reusable silicone-based liner 28 having similar components to the reusable liner 10 of FIG. 1. FIG. 3A is a side view showing a baked food item 37 that was supported by the silicone-based liner 28 during the baking process.

Reusable silicone-based liner 28 is shown having three ring-shaped measurement indictors 29, 30, 31 each extending a distance "d" inward from an interior surface 32a of a flexible sidewall 11 of the liner 28 with each of the measurement indictors 29, 30, 31 representing a specific volume or weight of food items supported by the liner 28 to facilitate precise measurement of baking food items.

In addition to ring-shaped measurement indictors 29, 30, 31 reusable silicone-based liners 28 is shown also having numeric measurement indictors 33, 34, 35, and 36 each in a reverse or mirrored condition and extending distance "d" inward from an interior surface 32a of the flexible sidewall 32. Example of distance "d" possible widths for distance "d"

include but is not limited to distance "d" being at least 1.0 millimeters and preferably at least 2.0 millimeters in width.

Referring to FIG. 3A, a feature of reusable silicone-based liner 28 is that distance "d" is sufficient in width to provide for corresponding measurement indicators on an exterior surface 37a of the baked food item 37 after the baking or cooking process. The corresponding measurement indicators are shown in FIG. 3A as comprising grooves 38 each identifying ¼ cups increments or portions of baked food item 37. The grooves 38 also functions are cutting guidelines to facilitate the dividing of the baked food item 37 into smaller pre-measured portions.

The corresponding measurement indicators are also shown in FIG. 3A as numeric identifiers 39, 40, 41, and 42 created by numeric measurement indictors 33, 34, 35, and 36 and embossed within each pre-measured portions of baked food item 37.

Figure 4:
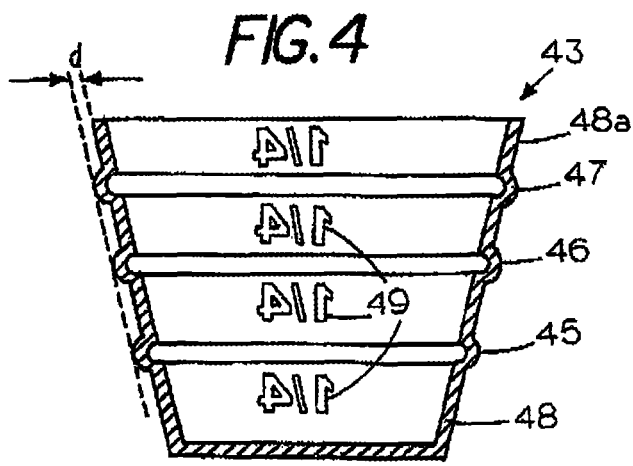
FIG. 4 is a cross-sectional view showing an alternative embodiment of a reusable silicone-based liner.
Figure 4A:
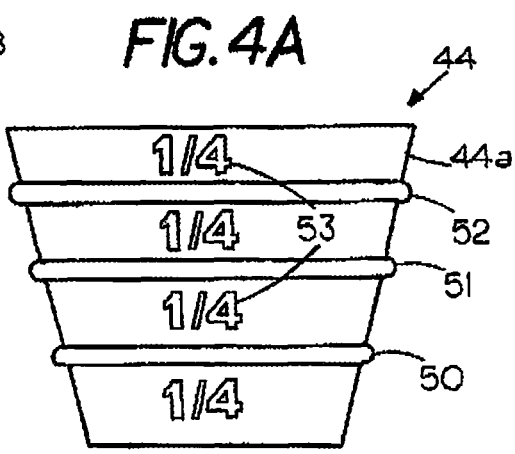
FIG. 4A is a side view showing a baked food item created by the silicone-based liner of FIG. 4.

Referring to FIGS. 4 and 4A, FIG. 4 is a cross-sectional view showing an alternative embodiment of a cupcake-pan accessory of the present invention comprising a reusable silicone-based liner 43 having similar components to the reusable liner 28 of FIG. 3. FIG. 4A is a side view showing a baked food item 44 that was supported by the silicone-based liner 43 during the baking process.

Similar to reusable silicone-based liners 28, reusable silicone-based liners 43 is shown having three ring-shaped measurement indictors 45, 46, 47 each extending distance "d" outward from an exterior surface 48a of a flexible sidewall 48 of the liner 43 with each of the measurement indictors 45, 46, 47 representing a specific volume or weight of food items supported by the liner 43 to facilitate precise measurement of baking food items. Reusable silicone-based liner 43 is shown also including numeric measurement indictors 49 each in a reverse or mirrored condition and also extending distance "d" outward from the exterior surface of the flexible sidewall 48 of the liner 43.

FIG. 4A shows baked food item 44 having annular protrusions 50, 51, 52 located on an exterior surface 44a of baked food item 44 that were created by the presence of ring-shaped measurement indictors 45, 46, 47 during the baking process. Annular protrusions 50, 51, 52 each identify ¼ cups increments or portions of baked food item 44 with the annular protrusions 50, 51, 52 also functions are cutting guidelines to facilitate the dividing of the baked food item 44 into smaller pre-measured portions.

Baked food item 44 also includes numeric identifiers 53 created by the presence of numeric measurement indictors 49 during the baking process and identify, numerically, pre-measured ¼ cup portions of baked food item 44 in a visually debossing typed manner on the surface 44a of baked food item 44.

I claim:

1. A cupcake-pan accessory comprising:
a reusable liner for receiving and holding food items during baking, the reusable liner including a flexible sidewall having a cupcake pan individual cup engaging exterior surface, an interior surface, a top edge and a bottom edge;
a base connected to the flexible sidewall proximal the bottom edge of the flexible sidewall; and
at least two baking food item inward measurement indicators located on the sidewall and visible around the interior surface of the flexible sidewall with the inward measurement indicators each representing a specific volume or weight of food items supported by the liner to facilitate precise measurement of baking food items, the inward measurement indicators each extending at least 1.0 millimeters inward from the interior surface of the liner, the inward measurement indicators forming inwards baked food measurement indicators located on and extending at least 1.0 millimeters inwards from an exterior surface of a baked food item supported by the liner.

2. The cupcake-pan accessory of claim 1 wherein the sidewall is corrugated to facilitate removal of a baked food item supported by the liner.

3. The cupcake-pan accessory of claim 1 wherein the cup is made from silicone.

4. The cupcake-pan accessory of claim 1 wherein the measurement indicators are embossed to the interior surface.

5. The cupcake-pan accessory of claim 1 wherein the inward measurement indicators are debossed to the interior surface.

6. The cupcake-pan accessory of claim 1 wherein the sidewall is more flexible than the base.

7. The cupcake-pan accessory of claim 1 wherein the base is circular-shaped, square-shaped, diamond-shaped, or triangular shaped.

8. The cupcake-pan accessory of claim 1 including outward measurement indicators each extending at least 1.0 millimeters outward from the exterior surface of the liner, the outward measurement indicators forming outward baked food measurement indicators on and extending at least 1.0 millimeters outwards from the exterior surface of the baked food item supported by the liner.

9. The cupcake-pan accessory of claim 1 wherein the at least two baking food item inward measurement indicators comprises three inward measurement indicators each representing a quarter cup of food item increments.

10. A cupcake-pan accessory comprising:
a reusable silicone-based liner for receiving and holding food items during baking, the reusable silicone-based liner including a flexible sidewall having a cupcake pan individual cup engaging exterior surface,
an interior surface, a top edge and a bottom edge;
a base connected to the flexible sidewall proximal the bottom edge of the flexible sidewall; and
at least two baking food item inward measurement indicators molded to the sidewall and visible around the interior surface of the flexible sidewall with the inward measurement indicators each representing a specific volume or weight of food items supported by the liner to facilitate precise measurement of baking food items, the inward measurement indicators each extending at least 1.0 millimeters inward from the interior surface of the liner, the measurement indicators forming inwards baked food measurement indicators located on and extending at least 1.0 millimeters inwards from an exterior surface of a baked food item supported by the liner.

11. The cupcake-pan accessory of claim 10 wherein the inward measurement indicators are embossed to the interior surface of the liner.

12. The cupcake-pan accessory of claim 11 wherein the sidewall is more flexible than the base.

13. The cupcake-pan accessory of claim 12 wherein the at least two baking food item inward measurement indicators comprise four inward measurement indicators each representing a quarter cup of food item increments.

14. The cupcake-pan accessory of claim 13 including outward measurement indicators each extending at least 1.0 millimeters outward from the exterior surface of the liner, the outward measurement indicators forming outward baked food measurement indicators on and extending at least 1.0 millimeters outwards from the exterior surface of the baked food item supported by the liner.

15. The cupcake-pan accessory of claim 10 wherein the inward measurement indicators are debossed to the interior surface.

16. A cupcake-pan accessory comprising:
   at least one reusable silicone-based liner for receiving and holding food items during baking, the reusable silicone-based liner including a flexible sidewall having a cupcake pan individual cup engaging exterior surface, an interior surface, a top edge and a bottom edge;
   a base connected to the flexible sidewall proximal the bottom edge of the flexible sidewall; and
   at least two baking food item inward measurement indicators molded to the sidewall and visible around the interior surface of the flexible sidewall, the inward measurement indicators each representing a specific volume or weight of food items supported by the liner to facilitate precise measurement of baking food items, the inward measurement indicators each extending at least 2.0 millimeters inward from the interior surface of the liner, the inward measurement indicators forming inwards baked food measurement indicators located on and extending at least 2.0 millimeters inwards from an exterior surface of a baked food item supported by the liner.

17. The cupcake-pan accessory of claim 16 wherein the at least one reusable silicone-based liner comprises at least four reusable silicone-based liner with the top edge of each liner connected to a liner support frame.

18. The cupcake-pan accessory of claim 17 wherein the sidewall is more flexible than the base to facilitate removal of a baked food item supported by the liner.

* * * * *